J. F. CONNELL.
APPARATUS FOR STORING, SUPPLYING, AND UTILIZING MINERAL OILS, &c.
APPLICATION FILED NOV. 10, 1904.
930,268.
Patented Aug. 3, 1909.
5 SHEETS—SHEET 1.
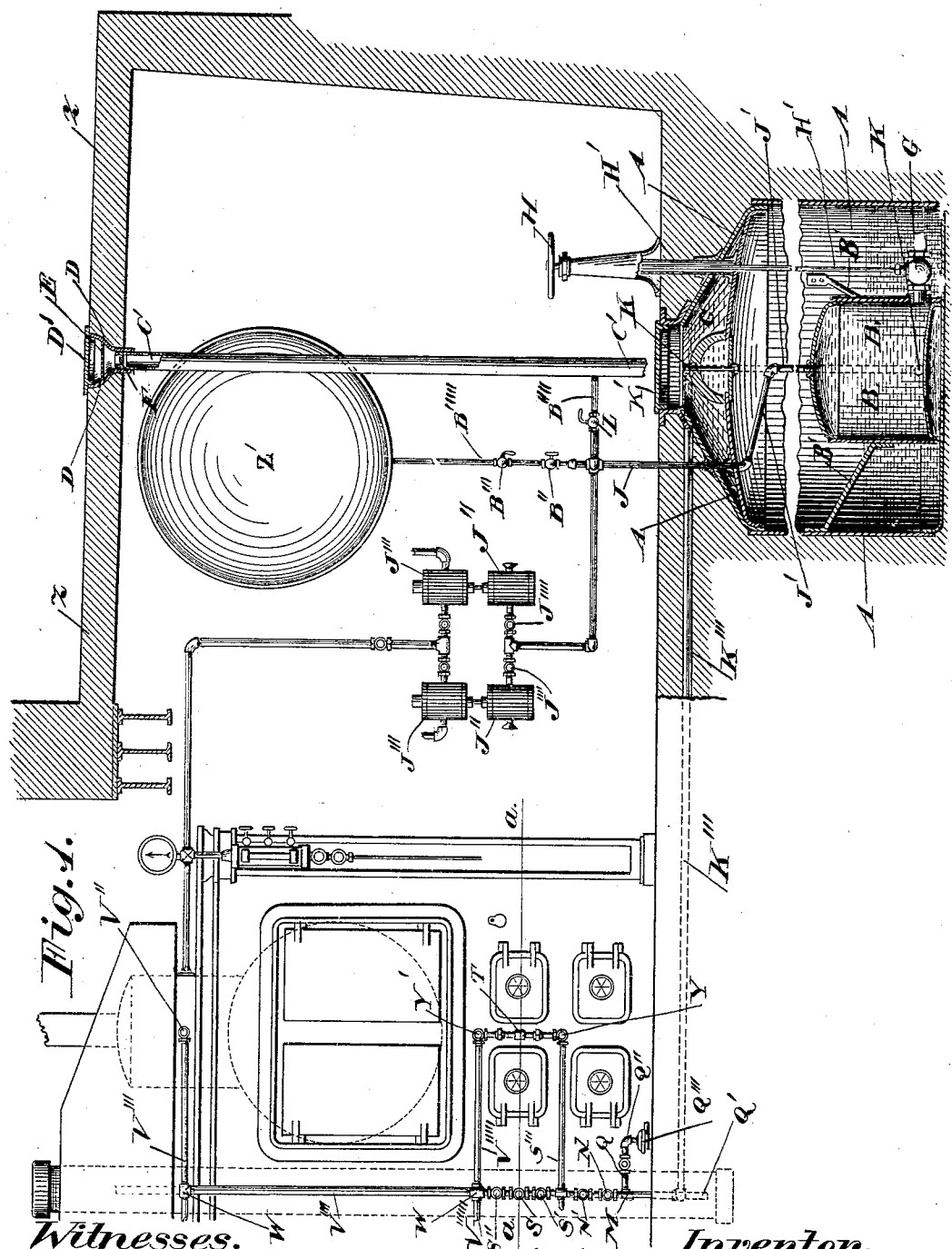
Witnesses.
Tracy B Hatch
Hadassah Day
Inventor.
John Francis Connell
By Atty. St John Day

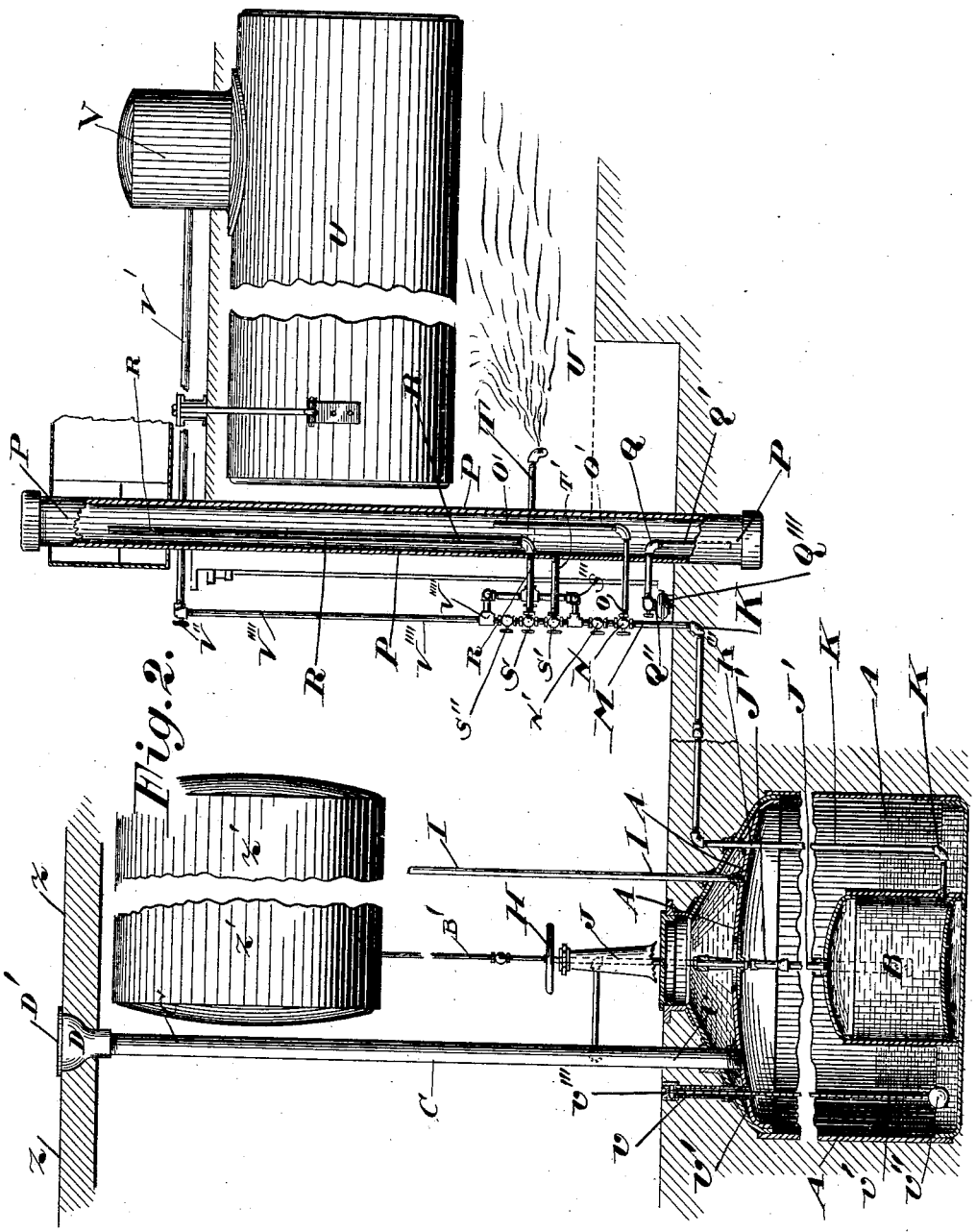

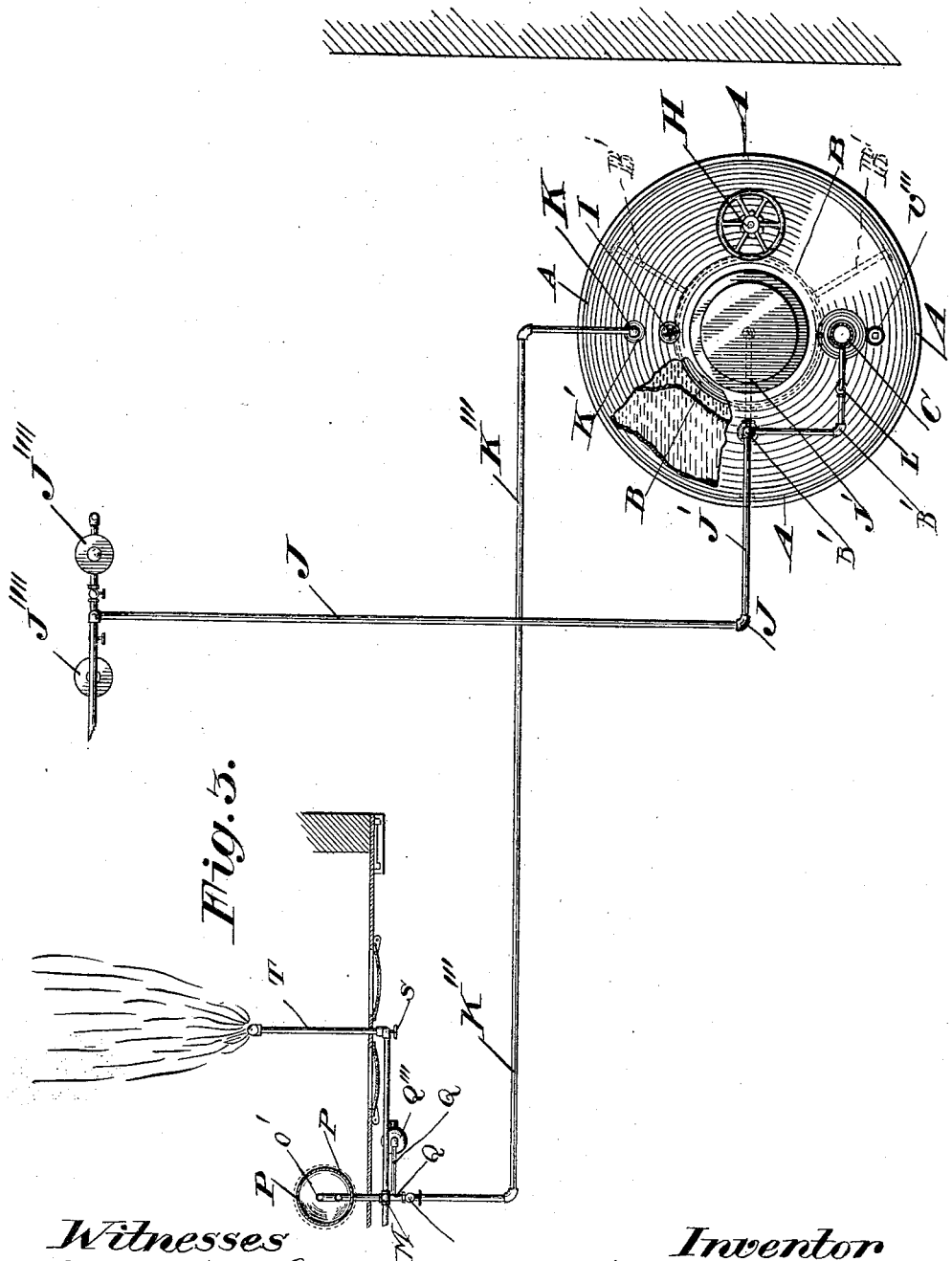

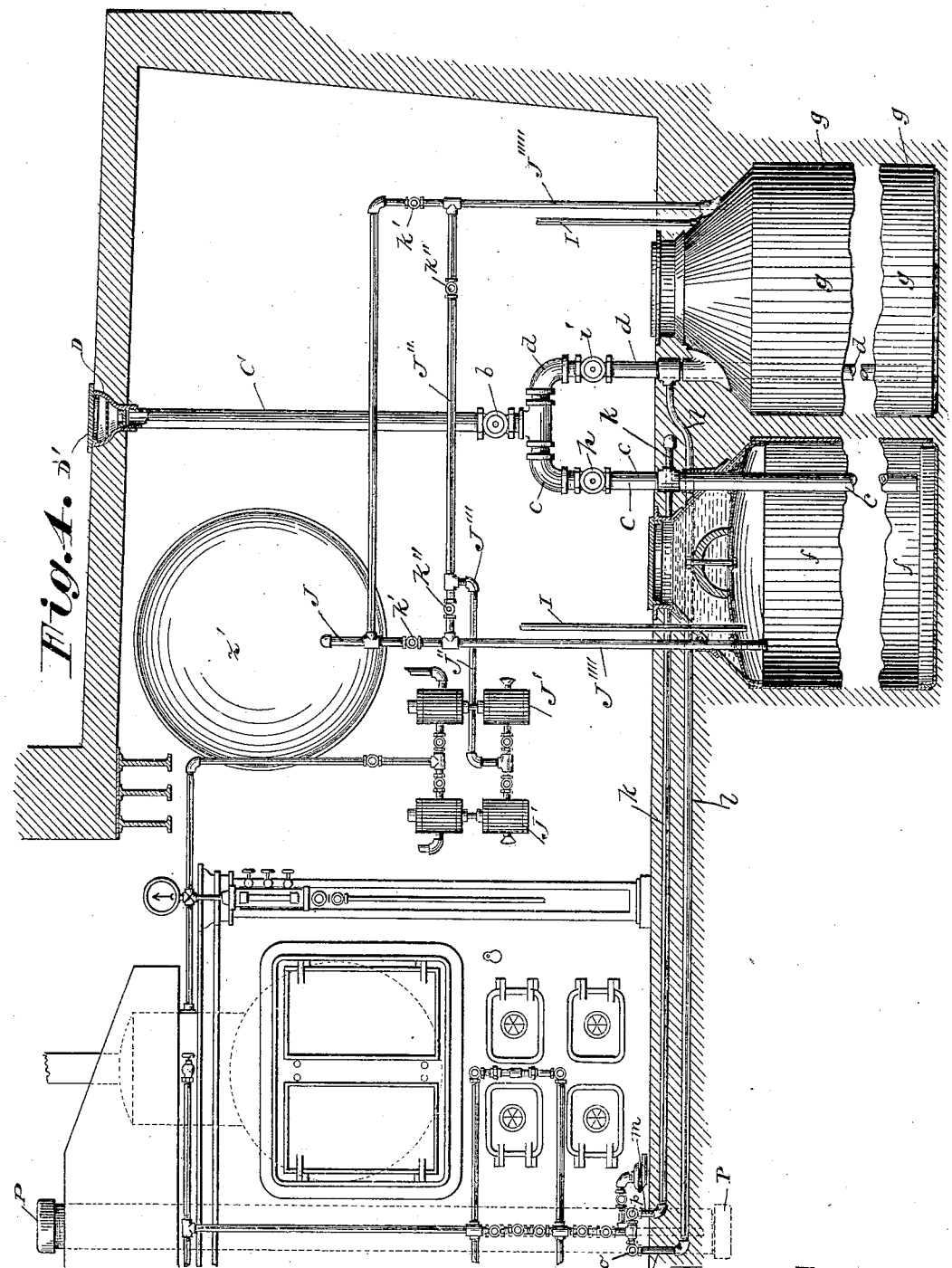

J. F. CONNELL.
APPARATUS FOR STORING, SUPPLYING, AND UTILIZING MINERAL OILS, &c.
APPLICATION FILED NOV. 10, 1904.
930,268.
Patented Aug. 3, 1909.
5 SHEETS—SHEET 5.
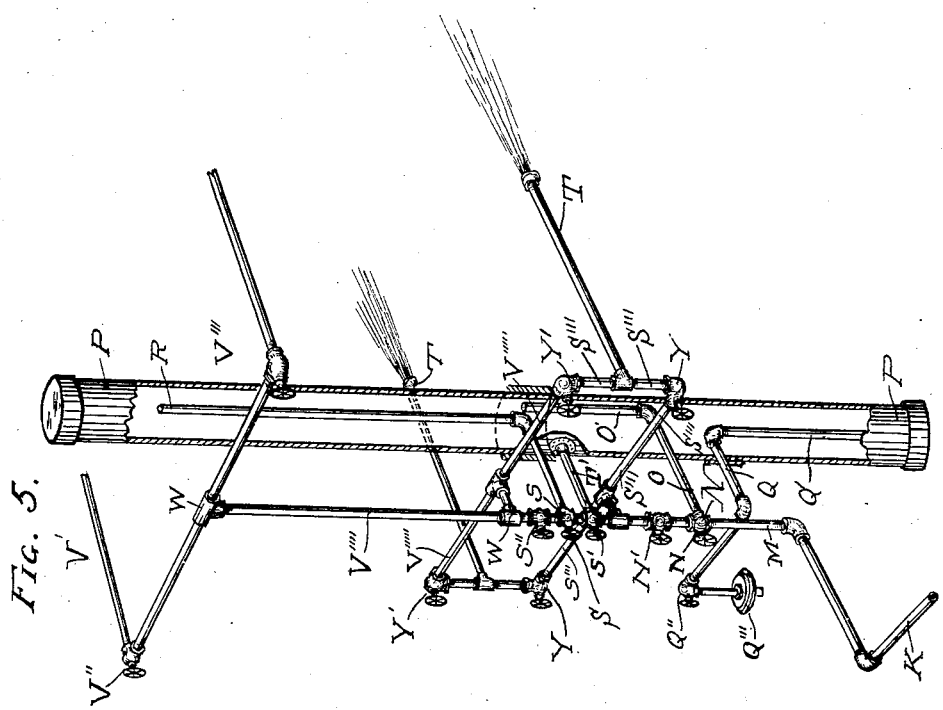
WITNESSES:
Ida M. Daskam
Robert Campbell Ferguson
INVENTOR.
John Francis Connell
By St. John Day.
ATTORNEY.

UNITED STATES PATENT OFFICE.

JOHN FRANCIS CONNELL, OF LOS ANGELES, CALIFORNIA.

APPARATUS FOR STORING, SUPPLYING, AND UTILIZING MINERAL OILS, &c.

No. 930,268.　　　　　Specification of Letters Patent.　　　　Patented Aug. 3, 1909.

Application filed November 10, 1904. Serial No. 232,903.

*To all whom it may concern:*

Be it known that I, JOHN FRANCIS CONNELL, of the city of Los Angeles, in the county of Los Angeles, in the State of California, have invented certain new and useful apparatus for storing, supplying, and utilizing mineral oils in the furnaces of steam-boilers and other furnaces or heating apparatus, the same being in part applicable for separating water and oil, of which the following is a full, clear, and exact description or specification, reference being had to the annexed drawings, and to the letters marked thereon.

My said invention which relates to the supply of mineral oil to, and the burning thereof as fuel in the furnaces of steam boilers, and other furnaces, has for its object not only to utilize the oil for the purposes aforesaid, but also to separate water therefrom so that the oil without water commingled therewith is supplied to the burner or burners in regulated and unvarying rate of flow and with the production of practically unvarying temperature, with complete combustion of the oil so used.

These objects are attained by means of the apparatus constituting my present invention and as shown by the accompanying drawings thereof.

Figure 1 of these drawings is a sectional view partly in front elevation of the apparatus constituting my invention, shown as applied to the furnace of a steam boiler. Fig. 2 is a view of the same, partly in section, and partly in elevation at right angles to Fig. 1. Fig. 3 is a plan of the oil tanks, pipes, separator and burner, etc., corresponding to Figs. 1 and 2, this view being taken at and below the line a, a, Fig. 1. Fig. 4 is a view of my apparatus in all respects the same as that shown at Figs. 1, 2, and 3, with the exception that in Fig. 4 the oil tanks are separate vessels, that is to say, in which each oil tank is external to the other oil tank, instead of one oil tank being contained within the other oil tank, as in Figs. 1, 2 and 3, and as hereinafter fully described. Fig. 5, is a perspective view of the steam and oil pipes and the valves thereon.

With reference to Figs. 1, 2 and 3 of the drawings, my invention is there shown as applied to the furnace of a steam boiler, as one of a pair or battery of steam boilers, such as are employed in an underground or basement engine room of a modern office building, hotel, power houses, or other large edifices, wherein engines for driving elevators, heaters, hot water supply apparatus, and electric lighting plants are usually installed.

In Figs. 1, 2 and 3, my apparatus is shown as consisting of the storage tank A, which contains within itself the service tank B. The storage tank A, has connected to it the supply or charging pipe C, which at its upper end is provided with a charging mouthpiece D, fixed in the sidewalk or street Z, of concrete, cement, or other material. The mouthpiece D, is covered with a removable cap D', which is lifted off, whenever required to charge oil into the storage tank A. Within the mouthpiece D, there is a perforated strainer E, whose function is to prevent solid matter from passing with the oil when charged down the pipe C, and into the tank A. This strainer E, is also removable, and is lifted out of the mouthpiece D, when oil is to be charged into the storage tank A, in order to obtain access by applying a hand or socket wrench to the top of the screwed plug F, and to unscrew this plug from out of the upper end of the pipe C, thereby opening the interior of the tank A, to the atmosphere. The strainer E, is then replaced in the mouthpiece D, and the tank A, is ready for receiving a charge of oil, from the portable oil tanks, wherein it is transferred from the oil wells to the mouthpiece D, the place of charging the tank A. When the charging of the storage tank A, is completed, the screwed plug F, is then replaced.

The service tank B, which is held in place by the stays B', within the storage tank A, is charged from the storage tank A, by opening the valve within the valve casing G, shown at Fig. 1. This opening is effected by an attendant turning the hand-wheel H, and the valve rod H', which opens the valve within the casing G, thus allowing oil to flow from the storage tank A, into the service tank B, until the service tank B, is filled with oil. The service tank B, is connected with a compressed air reservoir Z', which allows compressed air therein to flow when required into the storage tank A, through the charging pipe C, when the charging pipe C, is closed at its top by the plug F, and the valve L, is open. By means of this valve L, compressed air may be admitted from the reservoir Z', into the storage tank A, at any time when it may be necessary to blow through the same, or through the pipe C. When the service tank B, is fully charged from the storage tank A, by the oil passing by gravity thereinto through the valve G, the valve G, is closed by an attendant rotating the handwheel H, until it is completely shut into its seat as is well understood, and when the valve G, is closed, compressed air is admitted into the top of the service tank B, from the compressed air reservoir Z', by the branch J', of the pipe J, connected to the pipe B'''''. Upon the pipe B''''', is a valve B'', controlling the passage of compressed air from the reservoir Z', and a second valve B''', is also placed on the pipe B''''', as shown at Fig. 1, for the purpose of more completely closing the passage of air from the reservoir Z' whenever required. When the second valve B''', is open to the valve B'', and the valve B'', is also open, compressed air passes by the vertical pipe J, and the inclined branch thereof J' from the reservoir Z', into the top of the service tank B, and forces the oil out from the service tank B, through the pipe K, and thence through the pipe K''', M and O, into the pipe O', within the chamber P, of the separator, as more particularly shown at Figs. 2 and 3, wherein the water is separated from the oil as hereinafter fully described.

In the event of any accidental or other occurrence whereby the reservoir Z', is prevented from supplying compressed air to the storage or service tanks A, or B, provision is made for an emergency supply of compressed air directly from air compressing pumps which are indicated at J'', J'', Figs. 1, and 3. These pumps J'', J'', are driven by steam operating pistons in the cylinders J''', J''', by automatic valve gear, as is well understood, generally practiced, and therefore in this respect such pumps in themselves do not constitute part of my present invention. The air compressing pumps are provided with valves J'''', which when opened allow the compressed air to pass into the service tank B, and when these pumps are in use, the valve B''', is turned into the position whereat it prevents the compressed air from passing up through the pipe B''''', but allows the compressed air to flow through the open valves J'''', into the service tank B, by the pipes J, and J'.

In the roof of the storage tank A, there is connected a ventilating pipe I, which may be extended upward to any required height, for example to the roof of a building. This pipe I, admits of the discharge of gas from the oil in the storage tank, while also admitting of atmospheric pressure within the storage tank. By opening the cock L, the compressed air contained in the tank B, is allowed to flow into the tank A, and to expel any residual gases therein into the atmosphere.

The pipe K, as aforesaid leads the oil from the service tank B, through the pipe K''', to the vertical pipe M, Figs. 1, 2, 3, and 5. The pipe M, is provided with a screw valve N, Figs. 1, and 2, on opening which by hand the oil passes through the horizontal pipe O, Fig. 2, into the vertical pipe O', and overflows at the top of the pipe O', within the casing or closed chamber P, of the separator. When the oil arrives by the pipe O', to the chamber P, it not only overflows the pipe O', but fills the separator chamber P. A bent pipe Q, is fitted into the lower part of the chamber P, as shown at Figs. 2, and 5. The chamber P, being situated within the brickwork and breeching of the boilers absorbs heat from the heated and burning gases therein, so that the heated chamber P, causes the oil therein to become thinned and gradually vaporized, the vapor rising to the upper part of the chamber P, while water which is always commingled in or with mineral oil separates from the oil, and by reason of its greater density sinks to the lower part of the chamber P. The longer leg Q', of this pipe Q, dips to near the bottom of the chamber P, thereby constituting a passage through which the water which has accumulated therein by separation from the heated oil, is forced out of the chamber P, by reason of the pressure therein due to the weight of the column of oil above the water within the chamber P. To the shorter leg Q'', of the pipe Q, a water meter Q''', is attached, so that all the water contained in the oil used, is not only separated from the oil passed into the chamber P, but in addition to this, the quantity of water thus supplied with the oil, being compelled to pass through the meter Q''', is exactly measured, and when its bulk is subtracted from the bulk of oil supplied, the water thus separated from the oil and measured being deducted from the oil supply charged for, gives the true quantity of oil supplied, as fuel.

Within the chamber P, there is situated the stand pipe R, which is the pipe through which the oil within the chamber P, is forced out therefrom in quantity which is regulated by the valve Y, Fig. 1, on the bottom of the jointed vertical portion of the pipe marked S''', in its flow to the burner T, situated in the furnace U, below the boiler U'. The oil passes from the chamber P, through the pipe leading from the stand pipe R, to the valve S, as particularly shown at Figs. 2, and 5, thence through the valve S', and thence horizontally through the pipe S''', up through the lower valve Y, at the bottom of the jointed vertical part of the pipe S''', to the burner T, as shown at Figs. 1, and 2.

From the steam dome V, of the boiler U, a steam pipe V', is led. This pipe V', is provided at its outer end with a screw valve V'', connecting it to the horizontal branch V''', to the vertical pipe V'''', which again is connected by T-piece W, to the horizontal pipes V''''', Figs. 1, 2, and 5, leading to the top of the jointed vertical parts of the pipe S''', connecting with the burner T. From the T-piece W, a pipe connection is made above the valve S, by the valve S''. Steam in any desired quantity is admitted through the upper horizontal pipe V''''', downward through the upper valve Y', Figs. 1, and 5, to the burner T, commingling therein with the oil issuing or rising through the lower valve Y, and up through the jointed vertical parts of the pipe S''', from the chamber P, the commingled oil and steam burn, generating flame and heat on issuing from the burner T, from which the flame and heat pass in any desired quantity into the furnace U', thereby heating the furnace and generating steam within the boiler U. The horizontal burner pipe T, and its connections to the supply pipe R, are provided with valves and pipes as shown at Figs. 1, 2, 3, and 5, and marked by letters S, S', S'', S''', Y, Y', etc., as hereinbefore described, by the manual operation of which in the manner herein set forth and shown on the drawings, the attendant admits or cuts off the supply of oil and steam to the separator and burner, and thereby puts the apparatus into and out of action. In practice the valves N, and S, are open, and the valve N', also the valve S'', are closed.

In case of accident to the tanks A, and B, or for other causes, the valve N, and the valve N', should be closed; and the valve S', opened, allowing the oil in the chamber P, to flow through the pipe T', thence through the pipe S''', and valve Y, into the burner T, thus allowing the amount of oil still contained in the chamber P, to be utilized to maintain the fires in the furnaces, until the tanks A, and B, are repaired or recharged. By closing the valve N, the valve S, and the valve S', and opening the valve N', the oil will flow direct from the service tank B, to the burner T.

Into the roof of the storage tank A, a short vertical pipe $v$, is fixed, air tight. Through this pipe the stem $v'$, of a float $v''$, passes. Normally the short vertical pipe $v$, is kept closed over by the screw cap $v'''$. The object of this part of the device is to ascertain at any time the depth of oil in the storage tank, which is obtained by unscrewing the cap $v'''$, from the top of the vertical pipe $v$, which being effected, the float $v''$, rises to the surface of the oil within the storage tank A, thereby lifting the stem $v'$, to such a height above the top of the short pipe $v$, that the depth of oil in the storage tank is at once indicated.

In the form of my apparatus shown at Fig. 4, the separator, oil feeding and burning device and the water meter are the same as the corresponding parts hereinbefore described with reference to Figs. 1, 2, and 3, but as hereinbefore stated, two oil vessels each external to the other are shown, instead of two oil vessels one within the other, as in Figs. 1, 2, and 3, with the mouthpiece D, and its contained parts. The supply pipe C, is connected to a stop valve $b$, connected by two branch pipes $c$, and $d$, respectively, to the two tanks $f$, and $g$. Upon the pipes $c$, and $d$, there are respectively two other stop valves $h$, and $i$, by opening one of which simultaneously with the opening of the valve $b$, oil is admitted into either tank $f$, or $g$, as required, or by the opening of both of which valves $h$, and $i$, in connection with the opening of the valve $b$, oil is simultaneously admitted into both cylinders $f$, and $g$. The pipe J, is connected to the compressed air receiver $z$ shown in Fig. 4, but which is the same as that shown and hereinbefore described with reference to Figs. 1, 2, and 3. Compressed air is supplied to each or either reservoir $f$, and $g$, by opening either or both of the valves $k'$, on the pipes J''''', leading into the top of each tank $f$, and $g$, respectively and the oil from either tank $f$, or $g$, is led into the chamber P, of the separator, by either of the pipes $k$, or $l$, leading from the pipes $c$, or $d$, to the separator, as shown at Fig. 4. Two stop valves $o$, and $p$, respectively are placed on each of the short vertical pipes $m$, and $n$, respectively leading to the oil discharge pipe O, within the separator chamber P, being the same as the discharge pipe O, shown in section at Fig. 2, and from whichever of the tanks $f$, and $g$, the oil is being discharged to the separator chamber P, the corresponding valve $o$, or $p$, is opened and the other valve $o$, or $p$, closed. Auxiliary air pumps J', J', are connected by the pipe J'', and the bend J''', to the cross pipe J'''', which as aforesaid leads into the top of each tank $f$, and $g$, respectively. In the event of an emergency in the supply of compressed air from the compressed air reservoir, the valves $k'$, $k'$, are closed and the valve $k''$, opened, which convey compressed air from the pumps J', into the pipe J'''', from which it is taken into either tank $f$, or $g$, and forces the oil out of the tank up through the corresponding pipe $c$, or $d$, thence through the corresponding horizontal pipe $k$, or $l$, to either of the two upright pipes $m$, or $n$, to either of the valves $o$, or $p$, either of which when open leads to the vertical oil discharge pipe O', within the chamber P, of the separator, wherein the oil and water are separated and utilized all as hereinbefore described with reference to Figs. 1, 2, 3 and 4.

If in either of the tanks hereinbefore described and shown at Figs. 1, 2, 3 and 4, the supply of oil for feeding the separating chamber P, should from any cause become so diminished that the chamber P, should temporarily not receive such oil from the service reservoir, then the heating of the furnace is continued by using the residue of oil within the chamber P. This is effected by closing the cock N, which leads to the chamber P, the oil to the burner T, and by opening the valve N', which allows the oil in the chamber P, to pass down the pipe O', through the branch O, and through the valve N, into the oil pipe S''', and thence into the burner T, where it meets the steam passing into the burner T, as hereinbefore described. By the arrangement of the valves and pipes hereinbefore described and shown upon the annexed drawings, it is obvious that in the event of any occurrence whereby the separator may be rendered either inoperative or defective, that the separator may be cut out of the pipe circuit between the burner T, the oil supply from the service tank B, and the steam supply from the boiler, in which the oil instead of passing first into the separator P, would pass direct to the pipe T', and burner T, the steam supply from the boiler also being admitted to the burner, when the separator is cut out of action.

Having now described the nature of my said invention and the best system, mode or manner in or under which the same is or may be used or carried into practical effect, I desire to observe in conclusion, that what I consider to be novel and original and therefore claim as the invention to be secured to me by Letters Patent is as follows:

1. Apparatus for storing, supplying, and utilizing mineral oils, consisting of a storage tank under atmospheric pressure, a service tank under pressure greater than that of the atmosphere, the connections between the storage and service tanks, means for opening and closing said connections, a compressed air reservoir, a separator, a pipe and valves for opening and closing communication between the compressed air reservoir and the service tank, a burner, means connecting the separator to the burner and means for connecting the service tank and the separator, a boiler, means for connecting the steam space of the boiler with the burner, a pipe with an opening and closing device at its top connecting the storage tank with a street opening, a measuring float and stem, a pipe inclosing the measuring float and stem, an opening and closing top on said pipe, and a water meter connected to the separator for ascertaining the quantity of water separated from the oil, substantially as set forth.

2. Apparatus for storing, supplying, and utilizing mineral oils, consisting of a storage tank under atmospheric pressure, a service tank under pressure greater than that of the atmosphere, the connections between the storage and service tanks, means for opening and closing said connections, a compressed air reservoir, a separator, a pipe and means for opening and closing communication between the compressed air reservoir and the service tank, a burner, means connecting the separator to the burner, means for connecting the service tank and separator, a boiler, means for connecting the steam space of the boiler with the burner, a pipe with an opening and closing device at its top connecting the storage tank with a street opening, a measuring float and stem, a pipe inclosing the measuring float and stem, an opening and closing top on said pipe.

3. Apparatus for storing, supplying and utilizing mineral oils, consisting of a storage tank under atmospheric pressure, a service tank under pressure greater than that of the atmosphere, the connections between the storage and service tanks, means for opening and closing said connections, a compressed air reservoir, a separator, a pipe and means for opening and closing communication between the compressed air reservoir and the service tank, a burner, means connecting the separator to the burner, means for connecting the service tank and separator, a boiler, means for connecting the steam space of the boiler with the burner, a pipe with an opening and closing device at its top connecting the storage tank with a street opening.

In testimony whereof I have hereunto set my hand and seal at Los Angeles aforesaid in the presence of two subscribing witnesses.

JOHN FRANCIS CONNELL. [L. S.]

Witnesses:
ST. JOHN DAY,
J. D. CORY.